United States Patent [19]
Rigler et al.

[11] 3,928,252
[45] Dec. 23, 1975

[54] THICKENED FOOD

[75] Inventors: Lloyd E. Rigler, Los Angeles; Ghazi H. Taki, North Hollywood; Nicholas G. Spirtos, Tarzana, all of Calif.

[73] Assignee: Adolph's Ltd., Burbank, Calif.

[22] Filed: July 9, 1973

[21] Appl. No.: 377,452

Related U.S. Application Data

[62] Division of Ser. No. 206,912, Dec. 10, 1971, abandoned.

[52] U.S. Cl. ............... 426/573; 426/589; 426/572; 426/804; 252/315; 252/316; 252/363.5
[51] Int. Cl.² ............................................. A23L 1/04
[58] Field of Search ........... 426/167, 168, 169, 170, 426/191, 225, 97; 252/363.5, 315, 316

[56] References Cited
UNITED STATES PATENTS

| | | | |
|---|---|---|---|
| 1,974,474 | 9/1934 | Sher..................................... | 426/167 |
| 2,935,408 | 5/1960 | Steinitz............................... | 426/167 |
| 3,236,657 | 2/1966 | Cox...................................... | 426/170 |
| 3,476,571 | 11/1969 | Block et al.......................... | 426/168 |

*Primary Examiner*—Jeanette M. Hunter

[57] ABSTRACT

Thickened food prepared by adding all of the ingredients of a dry thickener substantially at the same time to a liquid food. The dry thickener contains carboxymethyl cellulose, a halogen donating compound, a bicarbonate and an organic acid. Greater solubility, dispersion and viscosity result.

17 Claims, No Drawings

THICKENED FOOD

This application is a division of Ser. No. 206,912, filed Dec. 10, 1971, now abandoned.

BACKGROUND OF THE INVENTION

I. Field of the Invention

The present invention relates generally to thickening agents and more specifically to hydrocolloidal thickeners, useful in food preparations and for other industrial applications, such as detergents, paper sizing, emulsion stabilizers, printing paste, pharmaceuticals, cosmetics, etc.

II. Description of the Prior Art

Starches have often been used for various thickening applications. For example, the most common method normally employed in the home for thickening food products involves the use of a starch, such as, flour or corn starch. There are various disadvantages for using a starch as a thickening agent. For example, the following are some typical disadvantages. Generally, starches must be premixed with a liquid in order to insure a lump free consistency; starches are normally dependent upon temperature for their thickening action; a starch cannot be utilized for many products which require thickening; carbohydrates found in starches contribute about four calories per gram and thus products thickened with a starch cannot usually be considered to be low calorie; starches generally present storage problems since insects may be attracted to the starch; and in commercial applications relatively large amounts of space are required for the storage of starches.

Other methods for thickening various products, including food products, include the use of hydrocolloids as thickening agents. In the past, hydrocolloidal thickeners have not been readily available in the home. One of the chief problems has been proper mixing. Vigorous agitation and high heat are generally required when the prior art hydrocolloidal thickeners are employed. Thus making them not suitable for home use and expensive and cumbersome for commerical use.

While hydrocolloidal thickeners have been employed in certain food products, the solubility and dispersion characteristics have up to the present generally been less than satisfactory. Once a certain amount of hydrocolloidal thickener has been added, the solution could not be made more viscous by the addition of additional thickener without forming unwanted lumps in the final product. Also, quite frequently clumping or lumps tended to form even upon initial addition of the hydrocolloidal thickener due to the hydrophilic nature of the gums or hydrocolloidal compounds used.

Sodium carboxymethylcellulose has been employed in the food industry, such as in fruit juice concentrates as taught in Perech, U.S. Pat. No. 2,393,561, as a stabilizer for sherbert, in Burt, U.S. Pat. No. 2,548,865, in freezable gels as taught in Glicksman, U.S. Pat. No. 3,060,032, in whipped topping as taught in Thompson, U.S. Pat. No. 3,230,091 and in various other food preparations. However, none of the known prior teachings involve a general purpose thickener for use in various media utilizing sodium carboxymethylcellulose in combination with a halogen contributing compound, (e.g., sodium chloride, potassium chloride, etc.) and with certain other ingredients, such as sodium bicarbonate and an organic acid which gives surprising and unexpected improvements in the solubility and dispersion characteristics of the thickener.

While the status of the prior art has generally been described above with respect to food preparations, similar problems involving the use of starches or hydrocolloidal gums exist in other industrial applications, such as in detergents, paper sizing, etc. For example, the use of starch in most industrial applications involves difficulties in obtaining a lump free consistency and the storage problems previously discussed. Also, starches cannot be utilized for the large number of products which may require thickeners. The use of gums or hydrocolloids in various industrial applications present problems in dissolving the thickener without vigorous agitation and high heat. Normally, expensive equipment such as high speed stirrers and heated vessels are required to provide the type of agitation and the high temperatures required when prior art hydrocolloidal thickeners were employed. The invented general purpose thickening agent eliminates the major shortcomings described above.

SUMMARY OF THE INVENTION

The present invention relates to a versatile general purpose hydrocolloidal thickening agent. The invented thickening agent has a low calorie content which is particularly desirable for use in food preparations. Also, the invented thickener allows instant solubilization over a wide pH range in both hot and cold media and also allows an initially thickened solution to be made more viscous by the addition of more dry thickener. Also, the invented thickener substantially overcomes the lumping problems generally associated with prior art gums or hydrocolloidal thickeners.

In its basic form the present invention comprises sodium carboxymethylcellulose which is combined with halogen donating compound (e.g., sodium chloride, potassium chloride, ammonium chloride, potassium iodide, etc.) and with sodium bicarbonate and an organic acid (e.g., citric, adipic or tartaric). It is believed that the addition of a halogen contributing compound increases hydration and, therefore, yields faster and more complete solubilization of the sodium carboxymethylcellulose and makes it somewhat more dispersible. Since sodium carboxymethylcellulose and other hydrocolloids are generally hydrophilic, it has been observed that when sodium carboxymethylcellulose is slowly added to water, even with stirring, clumps tend to form. The formation of clumps has been a definite disadvantage of hydrocolloids, as previously discussed. Sometimes to overcome this problem, a diluent, such as sugar has been added as a dispersing agent which tends to keep the gum particles separate and allow hydration independently with clumping. However, in the food industry, sugar is not always desirable, especially in the popular low-calorie formuations and products.

The present invention resolves the dispersion problem by utilizing what is believed to be the bursting action of the carbon dioxide produced when the invented thickener is used. The carbon dioxide is formed by the reaction of sodium bicarbonate and an organic acid, such as citric, adipic or tartaric. The dispersing action which is believed to be caused by the formation of carbon dioxide is an added factor to the improved rate of solubility achieved by the presence of the halogen contributing compound.

In addition, to the above basic constituents, certain optional but preferred constituents, such as anticaking agents and wetting or surfactive agents can be used to further improve the overall properties of the invented thickener. The invention and its various applications will be described in greater detail hereinafter.

DESCRIPTION OF THE PREFERRED COMPOSITIONS

The present invention relates to a versatile low-calorie instant thickening agent with improved solubilization properties. The invented thickening agent allows an initially thickened solution to be made more viscous by the addition of more of the dry thickener. The unique properties of this invention provides a thickener which is substantially instantly solubilized and further solubilization is possible without lumping.

The invented thickening agent is substantially instantly soluble in water, milk, and other hot or cold media over a pH range of about 2.4 to 12.6 and displays a stable viscosity. No time consuming pre-blending operation is required and the invented thickener donates a negligible amount of calories, if used in connection with food preparations.

All of the ingredients that comprise the instant thickener formula are approved by the Food and Drug Administration and are believed to be safe for human consumption.

The invented thickening agent provides the desirable thickening abilities of most synthetic and natural hydrocolloids without presenting the numerous disadvantages of starch, as previously discussed. Sodium carboxymethylcellulose is the preferred hydrocolloid since it yields optimum characteristics and properties.

The main advantages of the invented thickening agent over the prior art thickeners are: execellent solubility in various hot and cold media; stable viscosity over a wide range of temperatures; thickening takes place over a wide range of temperatures; can be used alone in a wide variety of foods; can be substituted for flour or corn starch in most applications; additional thickening of an already thickened solution is possible without premixing or excessive blending; contributes less than ½ calorie per gram; and, it can be stored easily in relatively small containers without attracting insects.

The basic formulation which is required to yield the overall properties described previously is as follows:

EXAMPLE I

| Ingredient | % by Wt. | % by Wt. of Preferred Composition |
|---|---|---|
| Sodium Carboxymethylcellulose | 50–75 | 54.0±4 |
| Halogen Donating Compound (e.g., sodium chloride, potassium chloride, ammonium chloride, potassium iodide, etc.) | 15–25 | 24.3±0.7 |
| Sodium or Potassium Bicarbonate | 10–15 | 13.5±1.5 |
| Organic Acid (e.g., citric acid, adipic acid, tartaric acid, etc.) | 3–10 | 8.2±1.5 |

While satisfactory results have been obtained throughout the ranges recited above; during experimentation it was found that a thickener having the above recited preferred composition yielded particularly excellent results over a wide range of pH (i.e., about 2.4 to 12.6) and for various hot and cold media.

Complete solubilization of a hydrocolloid in cold water can normally be effected only under extreme mixing conditions such as high-speed mechanical stirring for a long period of time. Even with high-speed stirring or agitation, once the agueous solution is thickened, it is almost impossible to dissolve any additional quantity of a hydrocolloid without unwanted lumping. With the invented instant thickener the presence of a halogen compound not only markedly enhances the initial dispersion and solubility of the hydrocolloid, but also allows further addition of the hydrocolloid to acheive greater viscosity in the already thickened medium. This phenomenon allows further addition of the thickener without lumping and instant solubilization which is unique and cannot be obtained with the prior art hydrocolloid systems.

Apparently, the presence of the halogen donating compound, acting as a dispersing agent, contributes to the dispersion of the hydrocolloid particles so as to increase the rate of solubilization. But its primary function seems to be more of a chemical nature than that of a simple dispersing agent as discussed below.

Sodium carboxymethylcellulose is manufactured by the reaction of sodium cellulose with sodium monochloroacetate as shown in the following reaction:

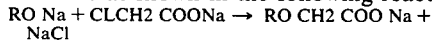
RO Na + CLCH2 COONa → RO CH2 COO Na + NaCl where R represents the known cellulose structure.

The above reaction indicates that sodium chloride is a by-product of this process. It seems chemically feasible that the addition of sodium chloride to the sodium carboxymethylcellulose further increases hydration and therefore, enhances a faster and more complete solubilization of sodium carboxymethylcellulose.

It has also been determined that potassium chloride and ammonium chloride acts in exactly the same manner as sodium chloride. Therefore, it is believed that a halogen donating compound is essential to create the conditions which make carboxymethylcellulose more dispersible and easier to solubilize with normal stirring action.

Gums, in general, are hydrophilic and sodium carboxymethylcellulose is no exception. Even when sodium carboxymethylcellulose is added to water slowly with stirring, clumps tend to form. This is a definite disadvantage of any hydrocolloid. Sometimes to overcome this problem a diluent, such as sugar, is added as a dispersing agent which keeps the gum particles separate and allows hydration independently, with less clumping.

For low-calorie formulations, the addition of sugar is not desirable. This invention resolves this problem by a different approach in which the gum particles are dispersed by the bursting action of carbon dioxide produced at the same time the gum particles come into contact with water. This is achieved by the addition of the sodium or potassium bicarbonate and an organic acid (e.g., citric, adipic or tartaric). The dispersing action by carbon dioxide is believed to be an added factor to the faster rate of solubility contributed by the presence of the halogen donating compound described above.

EXAMPLE II

While the composition of Example I gives excellent results for the reasons described above, it has been found that the addition of an anti-caking agent (e.g., silicon dioxide) and a wetting or surfactive agent (e.g., propylene glycol) further enhance the flowing properties and the overall rate of solubilization of the invented thickening agent. The following compositions and preferred composition exhibit the above described improved properties.

| Ingredient | % by Wt. | % by Wt. of Preferred Composition |
|---|---|---|
| Sodium Carboxymethylcellulose | 50–75 | 52.5±2.5 |
| Halogen Donating Compound (e.g., sodium chloride, potassium chloride, ammonium chloride, potassium iodide, etc.) | 15–25 | 23.6±1.4 |
| Sodium or Potassium Bicarbonate | 10–15 | 13.1±1.9 |
| Organic Acid (e.g., citric acid, adipic acid, tartaric acid, etc.) | 3–10 | 7.9±1.8 |
| Anti-Caking Agent (e.g., silicon dioxide) | 0.5–4 | 2.6±1.4 |
| Surfactant (e.g., propylene glycol) | 0.1–1 | 0.3±0.2 |

The overall compositions of Example II, and the preferred composition in particular, yield what is believed to be the most useful hydrocolloidal thickening agent for use either commercially or in the home.

In addition to the improved functions of the halogen donating compounds and the release of $CO_2$ from the sodium bicarbonate and organic acids achieved in Example I, the compositions of Example II yield even better overall properties as will be discussed in detail below.

All dry mixes have a tendency to cake or lose the characteristic of being free-flowing. To overcome this problem, conditioning or anti-caking agents are often used in the formulations during processing of the mixes. Although there are a number of anti-caking agents that are acceptable, it was found that for the invented thickening mix, silicon dioxide produced the most desirable effect from the standpoint of keeping the product free-flowing. Another great advantage of using silicon dioxide is that it also acts as a good dispersing agent. Other food grade anti-caking agents such as calcium silicate and tri-calcium phosphate could be used and satisfactory results obtained.

Further, as described above in Example I, sodium carboxymethylcellulose alone normally lumps because of the lack of dispersion. This problem was overcome in part by keeping the particles separated by the sudden release of carbon dioxide from the reaction of sodium bicarbonate and the organic acid. However, even though the particles have been successfully separated by this unique process when each particle (or a group of particles) comes into contact with water, it does not readily dissolve due to its relatively poor wettability. The tendency of gums, such as sodium carboxymethylcellulose is to form a membranous skin around a particle (or a group of particles) which prevents the gum molecules from coming in contact with the liquid and therefore impedes the rate of solubilization.

The addition of a wetting agent or surfactant overcomes this resistance to wetting and allows the inner part of the particles to get wet before any membranous skin forms, and therefore, improves the rate of solubilization. Among the various wetting or surfactive agents tried, propylene glycol was considered the most effective, especially for foods, since it is easier to use, is approved for use in foods, and imparts no flavor or color to the mix. However, any watersoluble food grade surfactant such as polyoxyethylene (20) sorbitan monolaurate, polyoxyethylene (20) sorbitan monopalmitate, or polyoxyethylene (20) sorbitan monostearate could be used in lieu of propylene glycol.

The unexpected and improved solubility and viscosity properties of the invented hydrocolloidal thickening agent can be seen from the following experimental data.

SOLUBILITY DATA

The following Tests A and B were conducted to show the unexpected and improved solubility of the invented thickening agent over pure sodium carboxymethylcellulose and various modified compositions of sodium carboxymethylcellulose.

TEST A - (Solubility in Water)

| Conditions: | Temperature = 25°C; water used as solvent; mixing by Fultork Lab Motor at approximately 90 volts with a 2-inch impeller; dry ingredients added in bulk. | |
|---|---|---|
| Thickening Agent | Results for a 1% Solution (2.5 gm) 250 ml water) | Results when additional 0.5% added to previous solution (total 1.5% solution) |
| Sodium Carboxymethylcellulose | For first 3 minutes material clung to impeller; After 3 minutes, material dislodged; After 5 minutes, 5% of material dissolved leaving remainder in large pieces throughout solution; | Clumped on contact with water and after 2 minutes very little (if any) dissolved. |
| Mixture of: Sodium Carboxymethylcellulose 80%; Sucrose 20% | The solubility increased over sodium carboxymethylcellulose alone; After 5 minutes there | Floated on contact with water and formed film; No dissolution after 2 minutes. |

-continued

Conditions: Temperature = 25°C; water used as solvent; mixing by Fultork Lab Motor at approximately 90 volts with a 2-inch impeller; dry ingredients added in bulk.

| Thickening Agent | Results for a 1% Solution (2.5 gm) 250 ml water) | Results when additional 0.5% added to previous solution (total 1.5% solution) |
|---|---|---|
| Mixture of: Sodium Carboxymethylcellulose 80%; sodium chloride 20% | were fewer large lumps than sodium carboxymethylcellulose alone, but it was still not totally solubilized. Solubility increased over sodium carboxymethylcellulose alone and combination of sodium carboxymethylcellulose and sucrose; After 5 minutes, there were few (10%) small transparent partially solubilized lumps. | Initially, material dispersed readily; After 2 minutes, there were many small (40%) transparent partially solubilized lumps. |
| Sodium Chloride 20% (dissolved in water first); Sodium Carboxymethylcellulose 80% (added to salt solution) | After 5 minutes; some lumps remained. Better solubility than sodium carboxymethylcellulose alone or sodium carboxymethylcellulose with sucrose, but not as good as mixture of sodium carboxymethylcellulose and sodium chloride. | |
| Sodium Carboxymethylcellulose 80% (added and mixed for 30 minutes); Sodium Chloride 20% (added) | Same as previous test with sodium chloride dissolved in water first, but lumps were slightly smaller after 5 minutes | |
| Mixture of: Sodium Carboxymethylcellulose 80%; Sodium Bicarbonate 10%; Citric Acid 10% | Complete dissolution in 60 seconds with many bubbles. | Floated on surface for 70 seconds; Sank as large lumps and after 2 minutes many (75%) small undissolved lumps present. |
| Invented thickener of Example II (with propylene glycol and silicon dioxide) | Complete dissolution in 30 seconds. | After 45 seconds, 95% dissolution; After 2 minutes, 100% dissolution. |
| Invented thickener without propylene glycol | Small lumps on contact with water. Complete dissolution in 45 seconds. | Complete dissolution in 2 minutes. |
| Invented thickener without silicon dioxide (wet appearance) | Complete dissolution in 45 seconds. | Small lumps in 30 seconds and complete dissolution in 2 minutes |

It should be noted from the above tests that the invented thickener with or without the surfactant (propylene glycol) and anti-caking agent yielded excellent and unexpected results when compared with the solubility of the other thickeners tested. The addition of the propylene glycol and silicon dioxide (Example II) does improve the solubility to a slight degree.

TEST B (Solubility in Various Media)

This test is intended to show the solubility of the invented thickener in various hot and cold media. Conditions: 2% by weight of the invented thickener (preferred composition of Example II) was sprinkled into solution and mixed with an ordinary teaspoon.

| Medium | Results in Cold Medium | Results in Hot Medium |
|---|---|---|
| Milk (4 oz.) | 1 tsp. thickener (2.2 gm) in milk completely solubilized after vigorous mixing and increased viscosity. | Same as cold milk, but less mixing required. |
| Pineapple Juice (4 oz.) | 1 tsp. thickener (2.2 gm) was instantly soluble and increased viscosity. | |
| Grapefruit Juice (4 oz.) | 1 tsp. thickener (2.2 gm). Same results as for pineapple juice. | |
| Tomato Juice (4 oz.) | 1 tsp. thickener (2.2 gm). Same results as for pineapple juice. | |
| Lemon Juice (4 oz.) | 1 tsp. (2.2 gm). Same results as for pineapple juice. | |

-continued

| Medium | Results in Cold Medium | Results in Hot Medium |
|---|---|---|
| Vinegar (4 oz.) | 1 tsp. thickener (2.2 gm). Same solubility as pineapple juice but less viscous. | |
| Vegetable Oil (4 oz.) | 1 tsp. thickener (2.2 gm). Same solubility as pineapple juice, but slightly more viscous. | |
| Bouillon (Beef and Chicken) (4 oz.) | (2.2 gm) was instantly soluble and increased viscosity was obtained. | 1 tsp. thickener |

It should be noted that for all the above liquid media, when additional thickener was added, the hydration rate was slower and more mixing was required before solubility was attained.

VISCOSITY DATA

The following Tests C–F were conducted to show the unique viscosity results and effects obtained using the invented thickener in different media. Also the effects of temperature and time on viscosity can be observed. The type of media utilized had pH's in the range of 2.4 to 12.6.

Tests C–F were all conducted using a Brookfield Viscometer, RVT, on a Helipath Stand, Model C with Spindle 3 at 20 rpm.

TEST C (Water)

| Solution Tested | Viscosity at 10°C | Viscosity at 25°C | Viscosity at 100°C |
|---|---|---|---|
| a. 1% preferred thickener of Example II in Water: 1 minute: | — | 75 cps | — |
| 10 minutes: | — | 137.5 cps | — |
| b. 1.5% preferred thickener of Example II in Water: 1 minute: | — | 187.5 cps | — |
| 10 minutes: | — | 460 cps | — |
| 20 minutes: | — | 537.5 cps | — |
| c. 2% preferred thickener of Example II in Water: 1 minute: | 500 cps | 750 cps | — |
| 10 minutes: | 1825 cps | 1650 cps | — |
| 50 minutes: | — | 1950 cps | — |
| d. Solution of (c) above heated to 100°C. | — | — | 75 cps |
| e. Solution of (d) above cooled to 10°C. | 3750 cps | — | — |
| f. Solution of (e) above heated to 100°C. | — | — | 150 cps |
| g. 2% invented thickener in water without propylene glycol: 1 minute: | — | 550 cps | — |
| 10 minutes: | — | 1750 cps | — |
| h. 2% invented thickener in water without silicon dioxide: 1 minute: | — | 500 cps | — |
| 10 minutes: | — | 1800 cps | — |

TEST D (Water and Sodium Hydroxide)

| Solution Tested | Viscosity at 10°C | Viscosity at 25°C | Viscosity at 100°C |
|---|---|---|---|
| 2% preferred thickener of Example II in solution of sodium hydroxide and water at pH 12.6: 1 minute: | — | 150 cps | — |
| 10 minutes: | — | 600 cps | — |

TEST E (Vinegar)

| Solution Tested | Viscosity at 10°C | Viscosity at 25°C | Viscosity at 100°C |
|---|---|---|---|
| 2% preferred thickener of Example II in vinegar at pH 2.4: 1 minute: | — | 60 cps | — |
| 10 minutes: | — | 650 cps | — |

TEST F (Milk)

| Solution Tested | Viscosity at 10°C | Viscosity at 25°C | Viscosity at 100°C |
|---|---|---|---|

TEST C (Water)-continued

| Solution Tested | Viscosity at 10°C | Viscosity at 25°C | | Viscosity at 100°C |
| --- | --- | --- | --- | --- |
| a. 2% preferred thickener of Example II in milk: | | | | |
| 1 minute: | — | 150 | cps | — |
| 10 minutes: | — | 1580 | cps | — |
| b. solution of (a) above warmed to 70°C | — | — | | 1300 cps (70°C) |
| c. solution of (b) above cooled to 25°C | — | 4325 | cps | — |

The invented thickening agent can be easily packaged as a dry mix in bottles (e.g., with a shaker top) or in bulk for home or industrial use. Also, it can be packaged in pre-measured packets for convenience. The invented thickening agent can also be used in combination with other ingredients in food or food products as will be discussed below in detail.

The invented thickening agent has tremendous versatility in its manner of use. For example, whether used in food preparations or for other industrial applications (e.g., paper sizing, printing paste, detergent, emulsion stabilizer, pharmaceuticals, cosmetics, etc.) the invented thickening agent may be stirred or shaken into the medium to be thickened until the desired thickeness is reached. A pre-measured amount can be dispensed and stirred; concentrated solutions may be diluted with additional solvent and already thickened solutions may be additionally thickened by adding more dry mix.

The invented thickening mix is particularly useful in the preparation of low-calorie food products, such as skimmed and low fat milk (including dry milk powders), salad dressings, gravies, meat and vegtable sauces, and dessert sauces with low-calorie sweeteners or slowly metabolized carbohydrates (e.g., mannitol, sorbitol, etc.).

Also, the invented thickening mix can also be used in various other food products, such as fruit desserts with wine or fruit sauces, other dessert sauces (e.g., lemon, vanilla, brandy, etc.); sauces for meat, fish and vegtables, various oriental dishes (e.g., sukiyaki, chicken almond, etc.), aspics, glazes, gravies, jams and jellies, cake and pie fillings, icings, etc.

In general, the invented thickener is especially useful where hot water dissolution of carboxymethycellulose is impractical and/or in the majority of applications where carboxymethylcellulose is employed.

The following are some exemplary or typical type applications for using the invented thickening agent in food or in preparing food products:

Cake Filling

| | |
| --- | --- |
| Crushed Pineapple | 18½ oz. Can |
| Thickener | ½ of teaspoon |

The pineapple juice is drained into a bowl and thickened with the low-calorie thickener. The fruit is then blended into the thickened juice. This mixture may be used between two (2) layers of cake or as a dessert topping.

Low-Calorie Raspberry Milk Shake

| | |
| --- | --- |
| Low Fat Milk | 1 cup |
| Crushed Raspberries, Unsweetened (Fresh or Frozen) | ½ of a cup |
| Adolph's Sugar Substitute | 1 teaspoon |
| Thickener | ½ of a teaspoon |

The milk, fruit, sugar substitute, and thickener are combined in blendor and are mixed.

Gravy

| | |
| --- | --- |
| Bouillon | 1 cube |
| Water, boiling | 1 cup |
| Margarine | 1 tablespoon |
| Thickener | 2 teaspoons |
| Salt | ¼ of a teaspoon |
| Pepper | Dash |

The bouillon cube is dissolved with boiling water in a small saucepan. Margarin salt, and pepper are then added. The thickener ia added by sprinkling from bottle and the gravy is stirred until thickener is dissolved.

Fromache

| | |
| --- | --- |
| Eggs | 2 separated |
| Sugar | ¼ of a cup |
| Lemon | 1, rind and juice |
| Thickener | 2 teaspoons |

The egg yolks and sugar are blended with a hand mixer until fluffy. The rind and juice from one lemon is added to yolk mixture and mixed. Then the thickener is slowly sprinkled into yolk mixture and blended. In a separate bowl, the egg whites are whipped until soft peaks are formed. The egg whites are then folded into the yolk mixture, then spooned into individual serving dishes.

Low-Calorie Mayonnaise

| | |
| --- | --- |
| Egg Yolk | One egg |
| Water | ⅓ of a cup |
| Lemon Juice | 1 teaspoon |
| Vinegar | 1 teaspoon |
| Dry Mustard | ½ of a teaspoon |
| Sugar | ½ of a teaspoon |
| Worchestershire Sauce | ⅛ of a teaspoon |
| Pepper | Dash |
| Thickener | ½ of a teaspoon |

The mustard, lemon juice, sugar, Worchestershire sauce, and pepper are blended together with a hand mixer. Then the egg yolk is added and whipped until mixture is foamy. The water and vinegar are added and blended. The thickener is sprinkled into mixture while continuing to beat with the mixer.

It should be clearly understood that the invention involves a general purpose thickening agent of wide application in both the home and industry. While certain examples and applications for use of the invented thickening agent have been discussed in detail above the invention is not intended to be so limited and many other uses and applications within the scope of the present invention will be apparent to those skilled in the art.

We claim:

1. A thickened food preparation produced by the addition of an initially dry thickening agent to a liquid food preparation, said initially dry thickening agent comprising the following ingredients:
a. about 50 to 75% sodium carboxymethylcellulose;
b. about 15 to 25% of a halogen donating compound;
c. about 10 to 15% of a bicarbonate selected from the group consisting of sodium and potassium bicarbonate; and
d. about 3 to 10% of an organic acid.
wherein said ingredients are added substantially at the same time to said liquid preparation.

2. The thickened food of claim 1 in which said halogen donating compound is selected from the group consisting of sodium chloride, potassium chloride, ammonium chloride and potassium iodide.

3. The thickened food of claim 1 in which said organic acid is selected from the group consisting of citric, adipic and tartaric acid.

4. A thickened food preparation produced by the addition of an initially dry thickening agent to a liquid food preparation, said initially dry thickening agent comprising the following ingredients:
a. about 54.0% sodium carboxymethylcellulose;
b. about 24.3% of a halogen donating compound;
c. about 13.5% of a bicarbonate selected from the group consisting of sodium and potassium bicarbonate; and
d. about 8.2% of an organic acid.
wherein said ingredients are added substantially at the same time to said liquid preparation.

5. The thickened food of claim 4 in which said halogen donating compound is selected from the group consisting of sodium chloride, potassium chloride, ammonium chloride and potassium iodide.

6. The thickened food of claim 4 in which said organic acid is selected from the group consisting of citric, adipic and tartaric acid.

7. A thickened food preparation produced by the addition of an initially dry thickening agent to a liquid food preparation, said initially dry thickening agent comprising the following ingredients:
a. about 50 to 75% sodium carboxymethylcellulose;
b. about 15 to 25% of a halogen donating compound;
c. about 10 to 15% of a bicarbonate selected from the group consisting of sodium and potassium bicarbonate;
d. about 3 to 10% of an organic acid;
e. about 0.5 to 4% of an anti-caking agent; and
f. about 0.1 to 1% of a water soluble surfactant.
wherein said ingredients are added substantially at the same time to said liquid preparation.

8. The thickened food of claim 7 in which said halogen donating compound is selected from the group consisting of sodium chloride, potassium chloride, ammonium chloride and potassium iodide.

9. The thickened food of claim 7 in which said organic acid is selected from the group consisting of citric, adipic and tartaric acid.

10. The thickened food of claim 7 in which said anti-caking agent is silicon dioxide.

11. The thickened food of claim 7 in which said anti-caking agent is calcium silicate.

12. The thickened food of claim 7 in which said anti-caking agent is tri-calcium phosphate.

13. The thickened food of claim 7 in which said surfactant is propylene glycol.

14. The thickened food of claim 7 in which said surfactant is selected from the group consisting of polyoxyethylene (20) sorbitan monolaurate, polyoxyethylene (20) sorbitan monopalmitate and polyoxyethylene (20) sorbitan monostearate.

15. A thickened food preparation produced by the addition of an initially dry thickening agent to a liquid food preparation, said initially dry thickening agent comprising the following ingredients:
a. about 52.5% sodium carboxymethylcellulose;
b. about 23.6% of a halogen donating compound;
c. about 13.1% of a bicarbonate selected from the group consisting of sodium and potassium bicarbonate;
d. about 7.9% of an organic acid;
e. about 2.6% of an anti-caking agent; and
f. about 0.3% of a water soluble surfactant.
wherein said ingredients are added substantially at the same time to said liquid preparation.

16. The thickened food of claim 15 in which said anti-caking agent is silicon dioxide.

17. The thickened food of claim 15 in which said surfactant is propylene glycol.

* * * * *